United States Patent
Goupil et al.

(10) Patent No.: US 9,216,830 B2
(45) Date of Patent: Dec. 22, 2015

(54) METHOD AND DEVICE FOR DETECTING OSCILLATORY FAILURES IN A POSITION SERVOCONTROL SUBSYSTEM OF AN AIRCRAFT CONTROL SURFACE

(71) Applicants: AIRBUS OPERATIONS SAS, Toulouse (FR); UNIVERSITE BORDEAUX 1, Talence (FR)

(72) Inventors: Philippe Goupil, Beaupuy (FR); Olivier Babando, Toulouse (FR); Mohcine Sifi, Bordeaux (FR); Loïc Lavigne, Beautiran (FR); Franck Cazaurang, Leognan (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 95 days.

(21) Appl. No.: 13/904,382

(22) Filed: May 29, 2013

(65) Prior Publication Data

US 2013/0325254 A1  Dec. 5, 2013

(30) Foreign Application Priority Data

May 30, 2012 (FR) ...................................... 12 55003

(51) Int. Cl.
*B64F 5/00* (2006.01)
*G05B 23/02* (2006.01)

(52) U.S. Cl.
CPC .......... *B64F 5/0045* (2013.01); *G05B 23/0254* (2013.01)

(58) Field of Classification Search
CPC .............. B64F 5/0045; G05B 23/0254; G05B 13/042; H04S 1/007; F15B 9/03; G01C 21/16; G06G 7/62; G06F 17/5095

USPC ........... 701/31.1, 33.9, 3; 703/21, 8; 244/197; 381/104; 91/417 R
See application file for complete search history.

(56) References Cited

U.S. PATENT DOCUMENTS

| | | | |
|---|---|---|---|
| 3,565,370 A * | 2/1971 | Waldemar Moller et al. | 244/197 |
| 4,649,803 A * | 3/1987 | Abel | 91/417 R |
| 6,208,914 B1* | 3/2001 | Ward et al. | 701/3 |
| 7,725,224 B2 | 5/2010 | Goupil | |
| 2003/0223597 A1* | 12/2003 | Puria et al. | 381/104 |
| 2007/0124038 A1* | 5/2007 | Goupil | 701/29 |

(Continued)

FOREIGN PATENT DOCUMENTS

FR  2936067 A1  3/2010

OTHER PUBLICATIONS

Institut National De La Propriete Industrielle, Preliminary Search Report for French Patent Application No. 1255003, dated Jan. 29, 2013.

(Continued)

*Primary Examiner* — Tuan C. To
*Assistant Examiner* — Yuri Kan
(74) *Attorney, Agent, or Firm* — Ingrassia Fisher & Lorenz, P.C.

(57) ABSTRACT

Methods and devices for detecting oscillatory faults in a positional servocontrol arrangement for an aircraft control surface are provided. The detection device estimates a reference position of the control surface and, with the aid of a model in which at each iteration a residual value of the previous iteration, multiplied by a dynamic gain, is injected, detects an oscillatory fault with the aid of this reference position.

8 Claims, 4 Drawing Sheets

(56) References Cited

U.S. PATENT DOCUMENTS

2009/0112564 A1* 4/2009 Schmieder ................... 703/21
2010/0318336 A1* 12/2010 Falangas ....................... 703/8

OTHER PUBLICATIONS

Treurnicht, J., "H-infinity Control", pp. 1-12, May 15, 2007, Retrieved from Internet: <http://courses.ee.sun.ac.za/Robuuste_Beheerstelsels_813/images/hinf2007.pdf>.

* cited by examiner

METHOD AND DEVICE FOR DETECTING OSCILLATORY FAILURES IN A POSITION SERVOCONTROL SUBSYSTEM OF AN AIRCRAFT CONTROL SURFACE

CROSS-REFERENCE TO RELATED APPLICATIONS

This application claims priority to French Patent Application No. 12 55003, filed May 30, 2012, which is incorporated herein by reference in its entirety.

TECHNICAL FIELD

The technical field relates to a method and a device for detecting oscillatory faults in at least one positional servocontrol arrangement for an aircraft control surface, as well as to a system of electric flight controls comprising such a detection device.

BACKGROUND

Generally, a servocontrol arrangement comprises electronic components which are liable, in failed mode, to bring about a spurious signal which may make the servocontrolled control surface oscillate. A phenomenon of this type is called an "oscillatory fault". Another possible cause of the oscillation is the malfunction or the breakage of a mechanical part of the actuator.

It is known moreover that when such an oscillatory fault exhibits a frequency which lies inside the passband of the actuator, its effect may be to bring about significant loads on the structure of the aircraft, thus necessitating a strengthening of this structure, if a dedicated device does not make it possible to detect this fault. Further, if an oscillatory fault exhibits a frequency which lies inside the passband of the actuator, its effect may be to bring about excessive loads in the case of excitation of one of the natural modes of vibration of the aircraft (phenomenon of resonance, aeroelastic coupling), and this may bring about, in the extreme case, damage to the structure of the aircraft. In addition, if an oscillatory fault exhibits a frequency which lies inside the passband of the actuator, its effect may be to accelerate the fatigue of the actuator or actuators used, and to reduce the comfort of the aircraft's passengers.

The complete coverage of such oscillatory faults would require overly expensive strengthening of structures of the aircraft. In practice, the aircraft is designed to absorb oscillatory faults of a certain amplitude, as a function of frequency. Hence, monitoring may be put in place to guarantee that the vibrations of the aircraft remain inside a predetermined amplitude/frequency envelope.

However, the routine solutions for carrying out such monitoring exhibit high dependency with respect to the hardware used; to the type of law for piloting the aircraft (function of the flexibility or otherwise of the latter); to the computer's acquisition and generating system; and to said computer's fault modes.

Consequently, to a particular family of aircraft there corresponds on each occasion a particular routine solution, which does not exhibit any guarantee of being applicable to another, existing or future, family of aircraft.

Moreover, the routine monitoring solutions generally exhibit restricted coverage, usually only carrying out detection of the oscillations brought about by a particular component of the servocontrol arrangement.

French Patent No. FR-2 893 911 makes it possible to remedy these drawbacks at least partially. It relates to a method, which is robust and which is applicable to any type of aircraft with electric flight controls, for detecting an oscillatory fault in a positional servocontrol arrangement of a control surface of the aircraft, in particular of a transport airplane, said method making it possible to detect an oscillatory fault of a minimum amplitude in a number of limited periods, and to do so whatever the frequency of this oscillatory fault.

According to French Patent No. FR-2 893 911, for this purpose, the following series of successive steps is carried out in an automatic and repetitive manner:

a) a theoretical position corresponding to a reference position of said control surface in the absence of any fault is estimated with the aid of a control surface control order which feeds a model of the actuator;

b) the difference between said theoretical position estimated in step a) and the actual position measured by the sensor is computed so as to form a residual value; and c) this residual value is compared with at least one predetermined threshold value, a counting is carried out of all the successive and alternate oversteppings of said predetermined threshold value by said residual value, and, as soon as the number resulting from said counting becomes greater than a predetermined number, an oscillatory fault is detected which represents a periodic signal of sinusoidal type, whose frequency, amplitude and phase follow a uniform law (that is to say do not exhibit any favored values).

French Patent No. FR-2 893 911 therefore envisages comparing the real operation of the monitored servocontrol arrangement (which is illustrated by the measured actual position), with fault-free expected ideal operation (which is illustrated by said theoretical position), thereby making it possible to highlight any oscillatory fault when it arises. This comparison is performed by computing a residual value. Consequently, by virtue of the method of detection of French Patent No. FR-2 893 911, it is possible to detect, in the monitored servocontrol arrangement, any oscillatory fault of a given minimum amplitude in a given number of periods.

Moreover, Patent Application No. FR-08 05131 discloses a method of detection based on that of French Patent No. FR-2 893 911 and envisaging reinjecting into the actuator model the residual value, multiplied by a particular gain, so as to accelerate the convergence of the estimation and to produce a residual value of lower amplitude.

In addition, other objects, desirable features and characteristics will become apparent from the subsequent summary and detailed description, and the appended claims, taken in conjunction with the accompanying drawings and this background.

SUMMARY

The present disclosure enhances the method of detection of French Patent No. FR-2 893 911 so as to optimize its performance, in particular so as to be able to detect lower levels of fault in a likewise lower confirmation time. Such an enhancement makes it possible to avoid the use of structural reinforcements on the aircraft and therefore allows the aircraft to be made lighter, rendering it more efficacious and helping to decrease its environmental footprint (noise, consumption).

The present disclosure therefore relates to a method for detecting at least one oscillatory fault in at least one positional servocontrol arrangement (of the aforementioned type) of at least one control surface of an aircraft, in particular of a transport airplane, the performance of which is optimized, that is to say which makes it possible to detect very low fault levels in a reduced confirmation time. This servocontrol arrangement is of the type comprising said control surface which is mobile, and whose position with respect to the aircraft is adjusted by at least one actuator; said actuator which adjusts the position of said control surface, as a function of at least one actuation order received; at least one sensor which measures the actual position of said control surface; and a computer which calculates an actuation (control) order for the control surface, transmitted to said actuator, on the basis of said measured actual position and of an order computed by the automatic pilot or on the basis of the action of the pilot on a control stick and of the inertial state of the aircraft.

For this purpose, according to the present disclosure, said method according to which the following series of successive steps is carried out in an automatic and iterative manner:

a) a theoretical position corresponding to a reference position of said control surface in the absence of any fault is estimated with the aid of said control surface control order which feeds a model of said actuator;

b) the difference between said theoretical position estimated in a) and the actual position measured by said sensor is computed so as to form a residual value; and c) this residual value is compared with at least one predetermined threshold value, a counting is carried out of all the successive and alternate oversteppings of said predetermined threshold value by said residual value, and, as soon as the number resulting from said counting becomes greater than a predetermined number, an oscillatory fault is detected which represents a periodic signal of sinusoidal type, whose frequency, amplitude and phase follow a uniform law, according to which method in a), at each iteration, said theoretical position is estimated with the aid, moreover, of at least one auxiliary value corresponding to the residual value formed in b) of the previous iteration, that has been multiplied by a gain, is noteworthy in that said gain is dynamic and is computed with the aid of an H-infinity synthesis procedure.

Advantageously, and as specified further hereinbelow, to determine said dynamic gain, the H-infinity synthesis is applied in four steps: definition of the synthesis scheme; setting up of weighting functions; casting into standard form; and choosing of the weighting functions and computation of the optimal gain.

Thus, by virtue of the present disclosure, the difference between the true position and the estimated position (that is to say the residual value), multiplied by a dynamic gain (which is very advantageous, as specified hereinbelow), is reinjected into the actuator model so as to accelerate the convergence of the estimation and to reject at least partially the effect of the external perturbations and modeling errors, and thus produce a residual value of lower amplitude, thereby making it possible to raise the performance of the method for detecting oscillatory faults. The performance of the monitoring of the oscillatory faults is consequently raised, both in terms of detection and robustness. This contributes notably to global optimization of an aircraft, in particular at the level of the structural layout of the latter. A direct consequence is a weight gain on the aircraft, since optimized detection performance makes it possible to avoid structural reinforcement.

Furthermore, the method in accordance with the present disclosure avoids resorting to sensors or to specific gauges to estimate the parameter(s) of the model of the actuator and does not therefore have any negative impact on the overall mass.

H-infinity synthesis (denoted $H_\infty$ hereinafter) offers a general framework for the computation of a corrector, by manipulating frequency concepts. It makes it possible to take into account objectives regarding stability, stability margins and modeling of various transfers, or indeed certain robustness objectives, as regards dynamic feedback of output. These objectives are achieved by imposing constraints on the various transfers within the system, by introducing frequency weighting functions. The latter play a very significant role, since they determine the passband of the controlled system, and also its robustness and its properties in terms of noise rejection.

The aim of applying this synthesis is generally to reject the perturbations. Within the framework of the present disclosure, the particular feature consists not in rejecting the perturbation, but in amplifying it. Thus, one seeks to amplify the oscillatory defect to be detected, so that it is highlighted more easily over the residual value and therefore more easily detectable.

According to the present disclosure, a corrector is envisaged for carrying out a correction in a) making it possible to obtain a significant amplification gain in a passband corresponding to the frequency band in which a fault may occur, and an attenuation outside of this passband so as to limit the effects of the perturbations on the residual value (robustness).

Furthermore, advantageously, said model of the actuator comprises a function of low order (in general 2).

Moreover, in an advantageous manner, a weighting function is also envisaged on at least one of the following parameters:

the estimated theoretical position;

the residual value.

The weighting function or functions used determine the passband of the controlled system and also its robustness and its properties in terms of noise rejection. These functions impose templates on various transfer functions so as to favor maximum gains on well-defined frequency domains. The choice of the location of these weightings depends on the transfers that it is desired to weight.

In one example, to determine such a weighting function, an iterative procedure is applied to the models of the transfer functions, which breaks down into four steps:

α1) choosing of the weighting functions;

α2) computation of the dynamic gain of the feedback loop with the aid of the Glover-Doyle algorithm for these weightings;

α3) generation of the Bode plots of two transfers; and

α4) if predefined conditions are fulfilled by the two transfers, the weightings are retained; otherwise, return to α1).

The present disclosure also relates to a device for automatically detecting at least one oscillatory fault in at least one positional servocontrol arrangement (of the aforementioned type) of at least one control surface (aileron, spoiler, elevator, rudder) of an aircraft, in particular of a transport airplane. As indicated previously, within the framework of the present disclosure, it is considered that an oscillatory fault is a periodic signal of sinusoidal type, whose frequency, amplitude and phase follow a uniform law, that is to say do not exhibit any favored values.

According to the present disclosure, said detection device of the type comprising: first means for estimating, in an iterative manner, with the aid of the control surface control order and of a model, a theoretical position corresponding to a reference position of said control surface in the absence of any fault; second means for computing the difference between said theoretical position estimated by said first means and the actual position measured by said sensor so as to form a residual value; third means for: comparing this residual value with at least one predetermined threshold value; carrying out a counting of all the successive and alternate oversteppings of said predetermined threshold by said residual value; and detecting an oscillatory fault as soon as the number resulting from said counting becomes greater than a predetermined number; and loopback means for forming and injecting into said first means at least one auxiliary value corresponding to the residual value formed by said second means at the previous iteration, which has been multiplied by a gain, said first means being formed so as to estimate said theoretical position with the aid, moreover, of said auxiliary value, is noteworthy in that said loopback means are formed so as to compute, with the aid of an H-infinity synthesis procedure, a dynamic gain which is used to form the auxiliary value to be reinjected.

The detection device in accordance with the present disclosure makes it possible to improve the structural design of the aircraft and participates in a mass gain, the detection of ever lower levels of faults making it possible to avoid structural strengthening. Thus, the environmental footprint of the aircraft decreases (fuel consumption, noise, etc.).

The present disclosure also relates to a system of electric flight controls of an aircraft, of the type comprising: at least one routine means (comprising for example a control stick) for bringing about a control surface control order for at least one control surface of the aircraft; and at least one positional servocontrol arrangement for this control surface, of aforementioned type.

According to the present disclosure, this system of electric flight controls is noteworthy in that it comprises, moreover, at least one device for detecting oscillatory faults, such as described previously.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
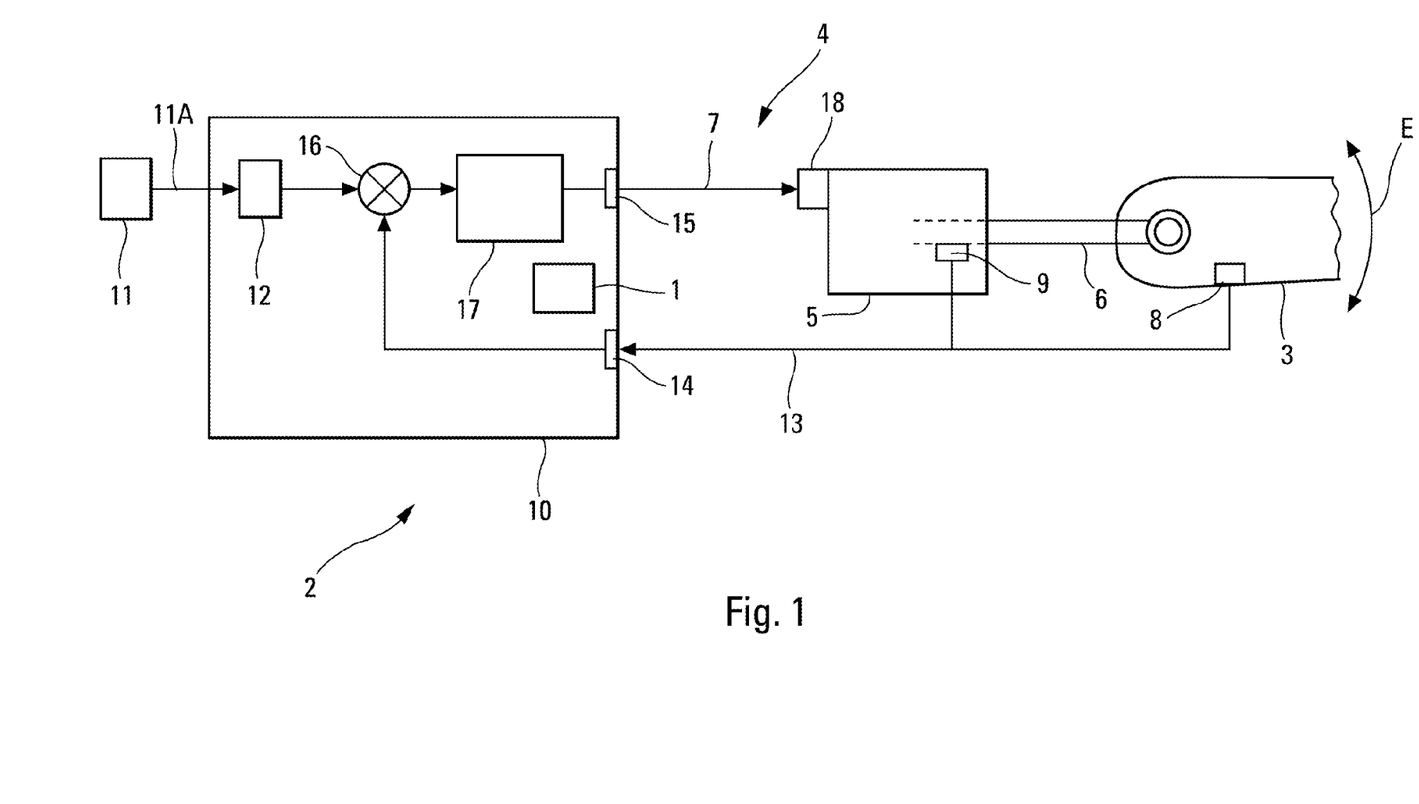
FIG. 1 schematically illustrates a positional servocontrol arrangement for an aircraft control surface, which comprises a detection device in accordance with the present disclosure.
Figure 2:
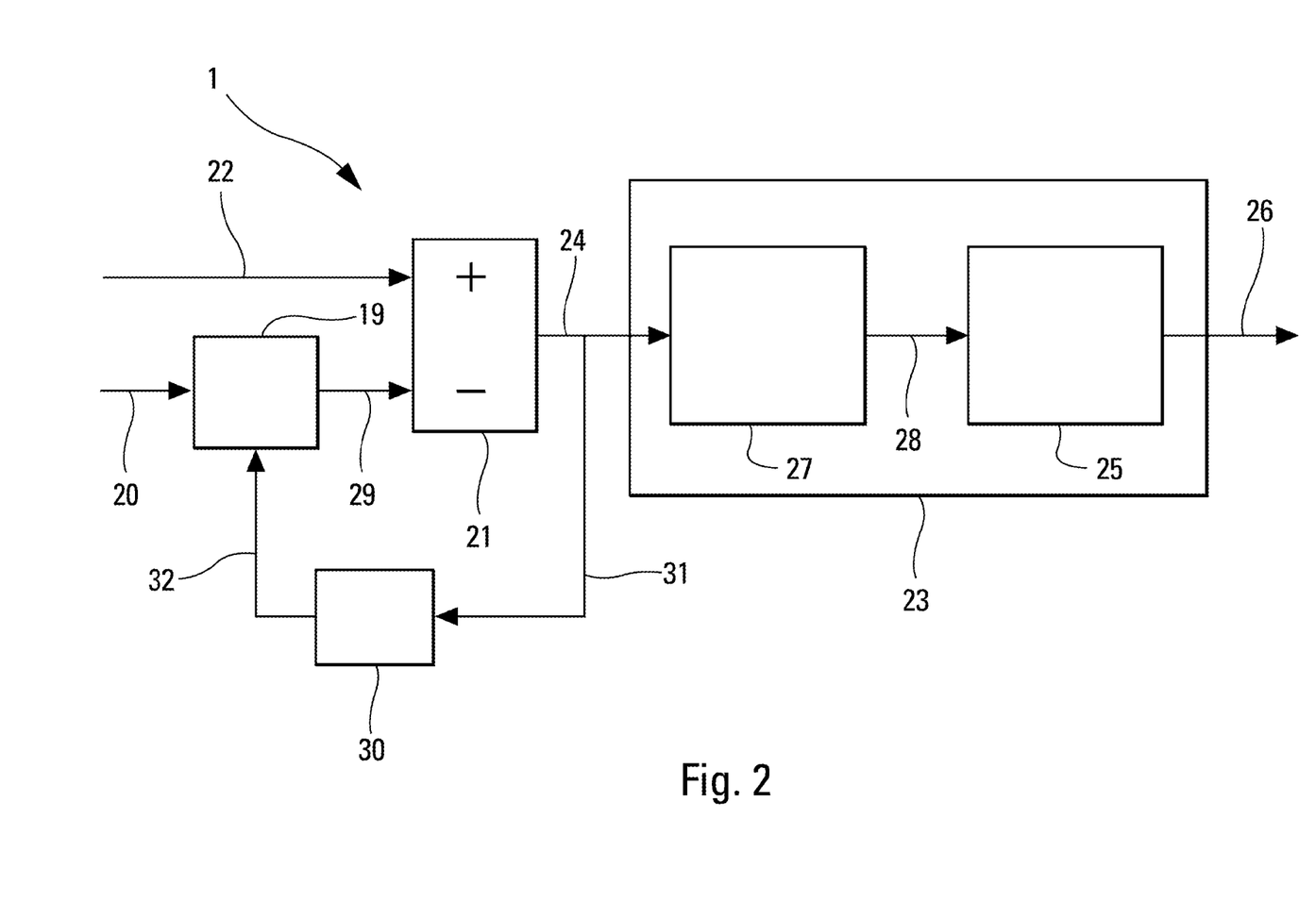
FIG. 2 is the schematic diagram of a detection device in accordance with the present disclosure.

The device 1 in accordance with the present disclosure and represented schematically in FIG. 2 is intended to detect at least one oscillatory fault in at least one positional servocontrol arrangement 2 (represented in FIG. 1) for at least one control surface 3 (aileron, spoiler, elevator, rudder) of an aircraft, in particular of a transport airplane.

In a routine manner, this servocontrol arrangement 2 forms part of a system of electric flight controls 4 of the aircraft and comprises: said control surface 3 which is mobile, by being liable to be deflected as illustrated by a double arrow E in FIG. 1, and whose position with respect to the structure of the aircraft is adjusted by at least one routine actuator 5; said actuator 5 which adjusts the position of said control surface 3, for example by way of a rod 6 which acts on the latter, as a function of at least one actuation order received by way of a link 7; at least one sensor 8, 9 which measures the actual position of said control surface 3. For this purpose, this may be a sensor 8 which is associated directly with the control surface 3 and/or be a sensor 9 which measures for example the displacement of the rod 6 of the actuator 5; and a computer 10, for example a flight controls computer: which receives control information from means 11, by way of a link 11A. These means 11 are routine means for generating control information and comprise, for example, a control stick which is liable to be actuated by a pilot of the aircraft and inertial sensors; which calculates in a routine manner a control surface control order, with the aid of an integrated computation means 12 which contains piloting laws and which uses for this calculation control information (for example action of the pilot on the control stick, parameters which indicate the position of the aircraft about its center of gravity, load factors that it undergoes) received from said means 11; which receives the actual position measured by the sensor or sensors 8 and 9, by way of a link 13, via an input 14 of analog type; which computes on the basis of the previous information (control surface control order and actual measured position) said actuation order, with the aid of an integrated computation means 17 taking account of a predetermined gain; and which transmits this actuation order to a component 18 which makes it possible to convert this order into motion of the rod of the actuator 5 (for example a servovalve in the case of a routine hydraulic servocontrol), by way of the link 7 via an output 15 of analog type.

All the elements of this servocontrol arrangement 2 which contain electronic components, and notably the sensors 8, 9, the analog input 14, the analog output 15, etc., are sources of oscillatory faults, that is to say of faults which are liable to bring about a spurious electrical signal which may make the control surface 3 oscillate.

Said system of electric flight controls 4 comprises, in addition to said servocontrol arrangement 2, the device 1 in accordance with the present disclosure which is intended to detect any oscillatory fault of the aforementioned type.

Accordingly, said detection device 1 comprises, as represented in FIG. 2: means 19 specified hereinbelow for determining, in an iterative manner, with the aid of the control surface control order brought about by said computation means 12 and received by way of a link 20 which is for example connected to the output of said computation means 12, and with the aid of an actuator model, a theoretical position which corresponds to a reference position of the control surface 3 in the absence of any oscillatory fault and which complies with said control surface control order; a computation means 21 for computing the difference between the actual position of the control surface 3 (which is measured by the sensor 8, 9 and which is received by way of a link 22 which is for example connected to said link 13) and the theoretical position (which is determined by said means 19 and which is received by way of a link 29) so as to form a residual value (or residual); and a processing unit 23 which is connected by way of a link 24 to said computation means 21 and which comprises means 25 for: comparing this residual value with at least one predetermined threshold value; carrying out a counting of all the oversteppings, which are at one and the same time successive and alternate, of the threshold value by the residual value; and detecting an oscillatory fault as soon as the number resulting from said counting becomes greater than a predetermined number.

Thus, the device 1 in accordance with the present disclosure compares the real operation (which is illustrated by the measured actual position of the control surface 3) of the monitored servocontrol arrangement 2, with fault-free expected ideal operation (which is illustrated by said computed theoretical position of the control surface 3), thereby making it possible to highlight any oscillatory fault when it arises. Consequently, said device 1 is able to detect, in the monitored servocontrol arrangement 2, any oscillatory fault of a given minimum amplitude in a given number of periods. Furthermore, the device 1 in accordance with the present disclosure makes it possible to detect all the modes of oscillatory failure existing in the servocontrol arrangement 2 of aforementioned type, and it is applicable to any type of aircraft.

In one exemplary embodiment, said processing unit 23 which can transmit the aforementioned information by way of a link 26 comprises, moreover, filtering means 27 which are connected by way of a link 28 to said means 25 and which are intended to decompose the residual value received, into a plurality of frequency bands, thereby making it possible to process denoised residual values and to define a plurality of corresponding time windows, in which the counting by way of the means 25 is carried out thereafter.

According to the present disclosure, to raise the detection performance, as well as the robustness of said detection device 1, the latter comprises, moreover, means 30 which are connected by way of links 31 and 32 respectively to the output of said means 21 and to said means 19 and which are formed so as to reinject into the actuator model (which is a behavioral model of the control surface 3 coupled to the actuator 5, and which is excited at input by the control surface control order) the difference between the true position and the estimated position (that is to say said residual value), multiplied by a particular dynamic gain (specified hereinbelow), so as to accelerate the convergence of the estimation and to reject at least partially the effect of the external perturbations and modeling errors, and thus produce a residual value of lower amplitude.

According to the present disclosure, said dynamic gain is computed with the aid of an H-infinity synthesis procedure (denoted $H_\infty$), specified hereinbelow.

Said means 19 therefore reinject into the actuator model the difference (multiplied by a dynamic gain) between the true position and the estimated position, so as to accelerate the convergence of the estimation and reject at least partially the effect of the external perturbations and modeling errors, thereby reducing the model discrepancy (and the exogenous noise), while ensuring stability, thereby making it possible to raise the performance of the device 1 for detecting oscillatory faults. The performance of the monitoring of the oscillatory faults is consequently raised, both in terms of detection and robustness. This contributes notably to global optimization of an aircraft, in particular at the level of the structural layout of the latter.

Except for the means 30, the detection device 1 in accordance with the present disclosure has all the characteristics of the detection device disclosed by the aforementioned patent FR-2 893 911. Hence, for reasons of simplification and understanding of the present text, these characteristics which form part of the present disclosure have not been further described here and this patent FR-2 893 911 is returned to for their detailed description. French Patent No. FR-2 893 911 is hereby incorporated herein by reference.

Figure 3:
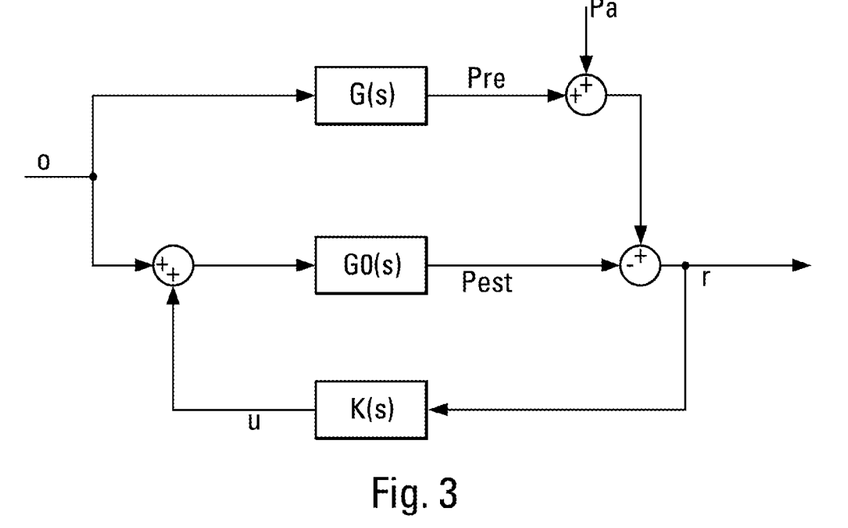
FIG. 3 to FIG. 7 are diagrams making it possible to explain the essential characteristics of the present disclosure and presenting various embodiments.

The detection device 1 therefore envisages looping back in the actuator model the difference between the true position and the estimated position, that is to say the residual value or residual, multiplied by a dynamic gain, to accelerate the convergence of the estimation and thus produce a residual of lower amplitude in the absence of any fault. Moreover, this dynamic gain makes it possible to amplify the effect of a fault on the residual in a certain frequency band. This approach is represented in FIG. 3. This FIG. 3 comprises the following notation:

G(s): the transfer function symbolizing the real system;
G0(s): the transfer function modeling the system;
K(s): the dynamic gain of the feedback loop;
Pre: the real position of the rod, such as controlled by the computer (in the case of a fault, the real position of the rod corresponds rather to the output of the adder, after summation of Pa);
Pest: the estimated position of the rod;
Pa: a fault;
r: the residual;
o: the order (piloting laws); and
u: the control.

It is known that H-infinity synthesis offers a general framework for the computation of a corrector, by manipulating frequency concepts. It makes it possible to take into account objectives regarding stability, stability margins and modeling of various transfers, or indeed certain robustness objectives, as regards dynamic feedback of output. These objectives are achieved by imposing constraints on the various transfers within the system, by introducing frequency weighting functions. The latter play a very significant role, since they determine the passband of the controlled system, and also its robustness and its properties in terms of noise rejection.

The aim of applying this synthesis is generally to reject the perturbations. However, within the framework of the present disclosure, the particular feature consists not in rejecting the perturbation, but in amplifying it. Indeed one seeks to amplify the oscillatory defect to be detected so that it is exhibited more easily on the residual and therefore more easily detectable.

More precisely, a regulator K(s) is determined making it possible to have a significant amplification gain in a passband corresponding to the frequency band in which the defect may occur, and an attenuation outside of this passband so as to limit the effects of the perturbations on this residual (robustness).

For the implementation of the present disclosure, any type of available actuator model can be used.

In one exemplary embodiment, the estimate of the position of the control surface 3 is computed by using an actuator model that is expressed in the form of transfer functions of low order (in general 2):

$$H(p) = \frac{a_0 + a_1 p + a_2 p^2}{b_0 + b_1 p + b_2 p^2}$$

This representation of the actuators makes it possible to have a good modeling of the behavior of the actuators while having a modeling that is easy to implement and frugal in terms of computation time.

These transfer functions are computed on the basis of the results of trials carried out with real actuators on dedicated partial test benches. Some of these trials are carried out under extreme environmental conditions (very hot and very cold) so as to best cover the real conditions of use of the actuators.

These trials are also correlated with trials carried out on aircraft so as to be certain of the good representativity of the partial benches.

The protocol of these trials consists in invoking the actuators through sinusoidal orders whose frequencies cover the whole of the frequency span of use of the actuators. Several setpoint amplitudes are tested with different actuator feed power levels so as to obtain the widest possible performance envelope. The performance of the actuators is represented by the attenuation and the phase shift of the measurement of the position of the rod of the actuator with respect to the position setpoint dispatched by the computers.

The computation of the transfer functions is carried out by means of a computing tool which computes the coefficients of the transfer functions so that the plots of the attenuation and of the phase shift pass as close as possible to the measurements carried out during the trials. As the behavior of the actuators is not linear, the representation of this behavior by a transfer function is a compromise between simplicity and precision of this modeling.

The dynamic gain of the feedback loop $K(s)$ will be determined by using the standard $H_\infty$ synthesis procedures. For a better understanding of the application of $H_\infty$ synthesis to the models of the transfer functions of the actuator, a reminder regarding the definitions of the $H_\infty$ norm as well as of the standard $H_\infty$ problem is given hereinbelow.

We consider an invariant linear system defined by the transfer matrix $G(s) \in R^{m \times n}$. We define the $H_\infty$ norm, denoted $\|G(s)\|_\infty$, in the following manner:

$$\|G(s)\|_\infty = \sup_{\omega \in R} \overline{\sigma}(G(j\omega))$$

where:

$$\sigma(G(j\omega)) = \sqrt{\lambda_i(G(j\omega)G(-j\omega)^T)} = \sqrt{\lambda_i(G(-j\omega)^T G(j\omega))}$$

$i=1, \min(m,n)$

The $\lambda_i$ represent the eigenvalues of the transfer function. $\overline{\sigma}(G(j\omega))$ is the largest singular value of $G(j\omega)$.

$\|G(s)\|_\infty$ therefore represents the highest value of the gain of the system between the norm 2 of the input signal and the norm 2 of the output signal over the set of angular frequencies (for a single-variable system, this is the highest value of $|G(j\omega)|$).

Figure 4:
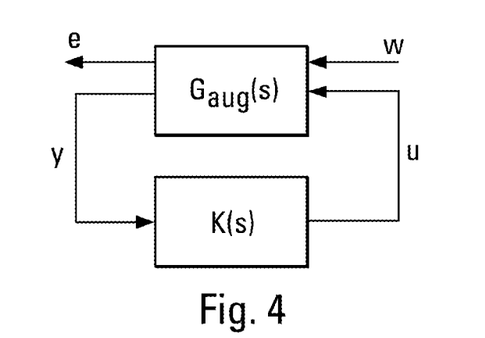

In its simplest form, the $H_\infty$ problem is a problem of determining a dynamic gain allowing the rejection of perturbation, while ensuring the stability of the closed loop. It consists in minimizing the effect of a perturbation on the behavior of the system. This standard problem is represented in FIG. 4.

The transfer matrix $G_{aug}(s)$ represents the augmented system, that is to say a transfer matrix containing the method $G(s)$, the model $G_0(s)$, as well as the interconnections between the exogenous and control inputs and the outputs and measurements. The interactions to be modeled are those between the following sets of inputs and outputs: the vector w represents the exterior inputs, such as reference signals, perturbations or noise acting on the system; the vector u represents the controls of the system; the signals e are chosen to characterize the proper operation of the servocontrol; and y represents the measurements available for calculating the control.

$K(s)$ represents the corrector which guarantees the stability of the looped system and makes it possible to obtain the best possible performance in accordance with certain criteria while guaranteeing a required level of robustness.

By performing a partition of the matrix $G_{aug}(s)$ in a manner consistent with the dimensions of w, u, e, y, it is possible to write:

$$G_{aug}(s) = \begin{pmatrix} G_{ew}(s) & G_{eu}(s) \\ G_{yw}(s) & G_{yu}(s) \end{pmatrix}$$

The transfer matrix relating w and e of the looped system is determined, corresponding to a transformation of lower LFT (for Linear Fractional Transformation) type (formalism making it possible to loop two linear systems together):

$$E(s) = F_l(G_{aug}(s), K(s))W(s)$$

$$F_l(G_{aug}(s), K(s)) = G_{ew}(s) + G_{eu}(s)K(s)(I - G_{yu}(s)K(s))^{-1}G_{yw}(s)$$

The $H_\infty$ synthesis of the corrector is defined by the following problem: $G_{aug}(s)$ and $\gamma > 0$ being given, determine $K(s)$ which stabilizes the looped system of FIG. 4, and ensures $\|F_l(G_{aug}(s), K(s))\|_\infty < \gamma$.

The correctors ensuring the smallest possible value of $\gamma$ are called "optimal" in the sense of performance and robustness. Here $\gamma$ represents a constraint parameter on the $H_\infty$ norm of the LFT transformation.

In order to meet specific requirements (for example, to reject the perturbations and amplify the effect of the faults between about 1 Hz and about 10 Hz), weighting functions are envisaged. These weighting functions play a role of filters making it possible to model the various transfers of the LFT transformation. Thus, the determination of the templates on these transfers will make it possible to achieve the objectives. The weighting functions chosen for the actuator model processed are specified hereinafter.

The $H_\infty$ synthesis applied to the models of the transfer functions of the actuator is a 2-input synthesis (FIG. 3). Indeed, account is taken of a vector w composed of 2 exogenous inputs, these being: the order o and the fault (Pa), for the case of a solid fault; and the order o and the fault (Pa) added to the real position (Pre) of the rod, for the case of a liquid fault.

To determine the dynamic gain of the feedback loop $K(s)$ (FIG. 3) making it possible to satisfy the detection criteria (power of the residual low in the absence of any fault, and little or no attenuation or amplification of the fault on the residual in a failure situation), the $H_\infty$ synthesis is applied in four steps: definition of a synthesis scheme; setting up of weighting functions; casting into standard form; and choosing of the weighting functions and computation of the optimal gain.

The $H_\infty$ synthesis (2 inputs) is applied to the models of the transfer functions of the actuator for the two types of fault (liquid and solid).

Figure 5:
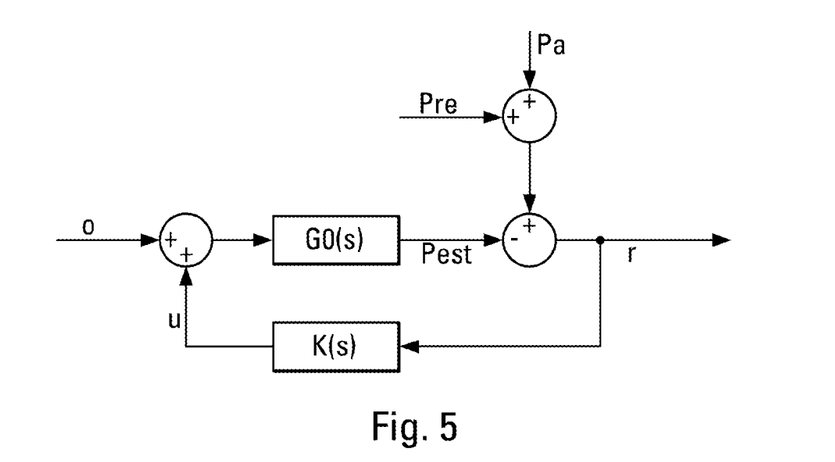

The scheme corresponding to the case of a solid fault, used for the $H_\infty$ synthesis, arises from FIG. 3, and is represented in FIG. 5.

In order to achieve the objectives, two weighting functions W1 and W2 are introduced. The aim of these functions is to impose templates on various transfer functions so as to favor maximum gains on well-defined frequency domains. The choice of the location of these weightings depends on the transfers that it is desired to weight, namely: the transfer between the fault and the residual (so that the fault can appear on the residual); and the transfer between the order and the residual (so that this transfer is a minimum, since in the absence of any fault the residual must be close to 0).

Figure 6:
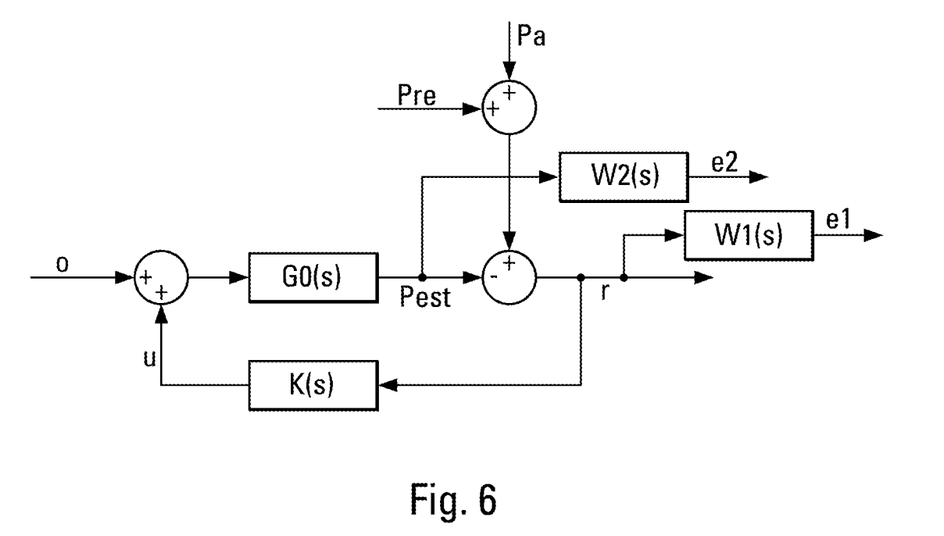

The signals that it is therefore desired to filter are the position Pest and the residual r (FIG. 6). Thus, it will be possible to model the transfers between these signals on one side, and the order o and the fault Pa on the other. These transfers correspond to the lower LFT transformation of the standard $H_\infty$ problem definable by a figure similar to FIG. 4 with r instead of y.

Let P(s) be the augmented system allowing the switch from FIG. 6 to the low LFT transformation of FIG. 4 modified in this way (r instead of y). This system comprises three inputs (Pa+Pre, o and u) and 3 outputs e1, e2 and r. It can therefore be rewritten in the form:

$$G_{aug}(s) = \begin{pmatrix} G_{e1w1} & G_{e1w2} & G_{e1u} \\ G_{e2w1} & G_{e2w2} & G_{e2u} \\ G_{rw1} & G_{rw2} & G_{ru} \end{pmatrix}$$

with:

$$w = \begin{pmatrix} w_1 \\ w_2 \end{pmatrix} = \begin{pmatrix} \text{Fault} + \text{P\_real} \\ 0 \end{pmatrix},$$

the exogenous inputs of the system;

$$e = \begin{pmatrix} e1 \\ e2 \end{pmatrix},$$

the exogenous outputs (signals to be monitored);
u, the control; and
r, the residual.

The transfer matrix $F_l(G_{aug}(s),K(s))$ relating the exogenous inputs and the outputs is then readily computed:

$$\begin{pmatrix} e1(s) \\ e2(s) \end{pmatrix} = \begin{pmatrix} G_{e1w1}(s) & G_{e1w2}(s) \\ G_{e2w1}(s) & G_{e2w2}(s) \end{pmatrix} \begin{pmatrix} w_1(s) \\ w_2(s) \end{pmatrix}$$

$$\begin{pmatrix} e1(s) \\ e2(s) \end{pmatrix} = \begin{pmatrix} W1(s)S(s) & -W1(s)S(s)G_0(s) \\ W2(s)K(s)S(s)G_0(s) & W2(s)S(s)G_0(s) \end{pmatrix} \begin{pmatrix} \text{Fault}(s) + P_{\text{real}(s)} \\ 0(s) \end{pmatrix}$$

with $S=(I+G_0K)^{-1}$ (called the sensitivity function).

The standard $H_\infty$ problem which stems therefrom is the following: determine a number $\gamma > 0$, and the observer gain K(s) stabilizing the looped system and ensuring:

$$\left\| \begin{matrix} W1S & -W1SG_0 \\ W2KSG_0 & W2SG_0 \end{matrix} \right\| < \gamma$$

This problem amounts to determining $\gamma > 0$ and K(s) stabilizing the system such that:

$|S| < \gamma |W1^{-1}|$ $|-SG_0| < \gamma |W1^{-1}|$ $|KSG_0| < \gamma |W2^{-1}|$ $|SG_0| < \gamma |W2^{-1}|$ In the case of a solid fault (the perturbing signal substitutes itself for the origin signal), it may be considered that the real position Pre is equal to 0 (this is not the case in reality, it is a computational convenience. It is justified since the solid fault substitutes itself completely for the real position). The previous transfers are unchanged:

$$\begin{pmatrix} e1(s) \\ e2(s) \end{pmatrix} = \begin{pmatrix} W1(s)S(s) & -W1(s)S(s)G_0(s) \\ W2(s)K(s)S(s)G_0(s) & W2(s)S(s)G_0(s) \end{pmatrix} \begin{pmatrix} \text{Fault}(s) \\ 0(s) \end{pmatrix}$$

The observer $H_\infty$ synthesis problem for the liquid or solid faults is therefore equivalent and processed in a single go.

The filters $W_1(s)$ and $W_2(s)$ make it possible to impose the various transfers. Indeed, there exists a direct relationship between these two transfers and the objectives to be achieved. It is desired to require that the transfer between the residual r and the fault Pa have a maximum gain between about 1 Hz and about 10 Hz. This transfer function is equal to S(s). Moreover, it is also desired that the transfer between the residual r and the order o have a minimum gain, which is to say that the residual is the closest to 0 in the absence of any fault. This transfer corresponds to $S(s)G_0(s)$.

Thus, to determine these weighting functions, only the transfers S(s) and $S(s)G_0(s)$ are of interest.

The larger and greater than 1 is the gain of the transfer S(s), the more amplified is the residual after the occurrence of a fault, and it is then possible to detect faults of lower amplitudes. The smaller and less than 1 is the gain of the transfer $S(s)G_0(s)$, the more attenuated is the residual with no fault, and it is therefore possible to lower the detection threshold without triggering false detections. It is therefore imperative to fulfill these two criteria so as to determine the optimal gain K(s).

The procedure used to determine the weighting functions is an iterative (dichotomy-based) procedure applied to the models of the transfer functions. This procedure breaks down into four steps:

$\alpha 1$) choosing of the weighting functions;

$\alpha 2$) computation of the dynamic gain K(s) of the feedback loop with the aid of the Glover-Doyle algorithm ("HINF-SYN" command in Matlab) for these weightings;

$\alpha 3$) generation of the Bode plots of the two transfers S(s) and $S(s)G_0(s)$;

$\alpha 4$) if ($|S|>1$ and $|SG0|<1, \forall f \in [1,10]$Hz), the weightings and gain are retained. Otherwise, we return to $\alpha 1$) and redo $\alpha 1$) to $\alpha 4$).

The weighting functions are initially selected with the aid of a function making it possible to compute the transfer functions corresponding to the weighting functions by using as input data: the gains for a frequency which tends to 0 and to infinity, as well as the various desired cutoff frequencies.

Various procedures can be envisaged to solve the standard $H_\infty$ problem, such as solution procedures employing Riccati equations, solution procedures employing Linear Matrix Inequality (LMI) or else Youla-Kucera parametrization.

Only the approach employing Riccati equations, in which the optimal value of $\gamma$ is sought by dichotomy, is presented hereinbelow.

This procedure uses a state representation of the interconnection matrix $G_{aug}(s)$, which may be written in the following form:

$$\begin{pmatrix} \dot{x}(t) \\ e(t) \\ y(t) \end{pmatrix} = \begin{pmatrix} A & B_w & B_u \\ C_e & D_{ew} & D_{eu} \\ C_y & D_{yw} & D_{yu} \end{pmatrix} \begin{pmatrix} x(t) \\ w(t) \\ u(t) \end{pmatrix}$$

with $x \in R^n$ state variable; $w \in R^{n_w}$ $u \in R^{n_u}$; $e \in R^{n_e}$; $y \in R^{n_y}$.

This procedure is also known as the Glover-Doyle algorithm.

Let $P=P^T$, $Q=Q^T$ be matrices of the same dimension as A. We put:

$$X = Ric\begin{pmatrix} A & -P \\ -Q & -A^T \end{pmatrix}$$

When it exists, X is the positive symmetric solution of the Riccati equation:

$$XA + A^T X - XPX + Q = 0$$

such that all the eigenvalues of A−PX have a strictly negative real part.

To solve the standard $H_\infty$ problem, with the aid of the Glover-Doyle algorithm, it is assumed that the following assumptions (H1 to H6) are satisfied:

H1) $(A, B_u)$ is stabilizable and $(C_y, A)$ is detectable. This condition is necessary and sufficient for the existence of a compensator which stabilizes the looped system in an internal manner;

H2) $\text{rank}(D_{eu})=n_u$ and $\text{rank}(D_{yw})=n_y$. This condition is sufficient for the transfer matrix of the corrector to be proper;

$$\forall \omega \in Rrank\begin{pmatrix} A - j\omega I_n & B_u \\ C_e & D_{eu} \end{pmatrix} = n + n_u; \quad \text{H3}$$

$$\forall \omega \in Rrank\begin{pmatrix} A - j\omega I_n & B_w \\ C_y & D_{yw} \end{pmatrix} = n + n_y. \quad \text{H4}$$

These last two assumptions are called "regularity assumptions". They imply that $G_{eu}(S)$ and $G_{yw}(S)$ have no zero on the imaginary axis;

$$D_{eu}^T(C_e \ D_{eu}) = (0 \ I_{n_u}) \text{ and } \begin{pmatrix} B_w \\ D_{yw} \end{pmatrix} D_{yw}^T = \begin{pmatrix} 0 \\ I_{n_y} \end{pmatrix}; \quad \text{H5}$$

and

H6) $D_{eu}=0$ and $D_{yu}=0$.

It is always possible to satisfy the last two assumptions termed "normalization assumptions" by appropriate changes of variables.

The following theorem 1 makes it possible to test the feasibility of the standard problem. Under the above assumptions, the standard $H_\infty$ problem has a solution if and only if the following five conditions are fulfilled:

i) the matrix $$H_\infty = \begin{pmatrix} A & \gamma^{-2} B_w B_w^T - B_u B_u^T \\ -C_e^T C_e & -A^T \end{pmatrix}$$

does not have any eigenvalue on the imaginary axis;

ii) there exists a matrix $X_\infty = Ric(H_\infty) \geq 0$;

iii) the matrix $$J_\infty = \begin{pmatrix} A^T & \gamma^{-2} C_e^T C_e - C_y^T C_y \\ -B_w B_w^T & -A \end{pmatrix}$$

does not have any eigenvalue on the imaginary axis;

iv) there exists a matrix $Y_\infty = Ric(J_\infty) \geq 0$; and v) $\rho(X_\infty Y_\infty) < \gamma^2$, where $\rho$ designates the modulus of the largest eigenvalue.

Finally, the solution of the standard problem is given by the following theorem 2. Under the conditions of theorem 1, the central corrector K(s) stabilizing the system and satisfying $\|F_l(G_{aug}(s), K(s))\|_\infty < \gamma$ admits the following state representation:

$$\begin{pmatrix} \dot{x}_c(t) \\ u(t) \end{pmatrix} = \begin{pmatrix} \hat{A}_\infty & Z_\infty Y_\infty C_y^T \\ -B_u^T X_\infty & 0 \end{pmatrix} \begin{pmatrix} x_c(t) \\ y(t) \end{pmatrix}$$

with:

$$\hat{A}_\infty = A + \gamma^{-2} B_w B_w^T X_\infty - B_u B_u^T X_\infty - Z_\infty Y_\infty C_y^T C_y$$

$$Z_\infty = (I_n - \gamma^{-2} Y_\infty X_\infty)^{-1}$$

The implementation of this solution therefore consists in using firstly the results of theorem 1 to approximate the optimal value of γ by dichotomy (a procedure commonly called "γ-iteration"). The central corrector is computed thereafter by applying theorem 2.

In this synthesis, only a single exogenous input is taken into account, this being the order o for the formulation of the $H_\infty$ problem.

Just as for the 2-input synthesis, the application is carried out in four steps:
- definition of a synthesis scheme (FIG. 5);
- setting up of weighting functions;
- casting into standard form; and
- choosing of the weighting functions and computation of the optimal gain.

Two weighting functions W1 and W2 on the various signals (FIG. 7) are introduced, which will take the form of filters making it possible, in accordance with the signal to which they are applied, to favor a particular domain of frequencies. The signals that it is desired to weight are: the input g of G0(s) and the residual r. Thus, it is possible to model the transfers between these signals and the order o, which are none other than the transfers of the lower LFT transformation of the standard problem. However, these transfers are the same transfers as those processed in the synthesis with 2 inputs: S(s) and S(s)G0(s).

Figure 7:
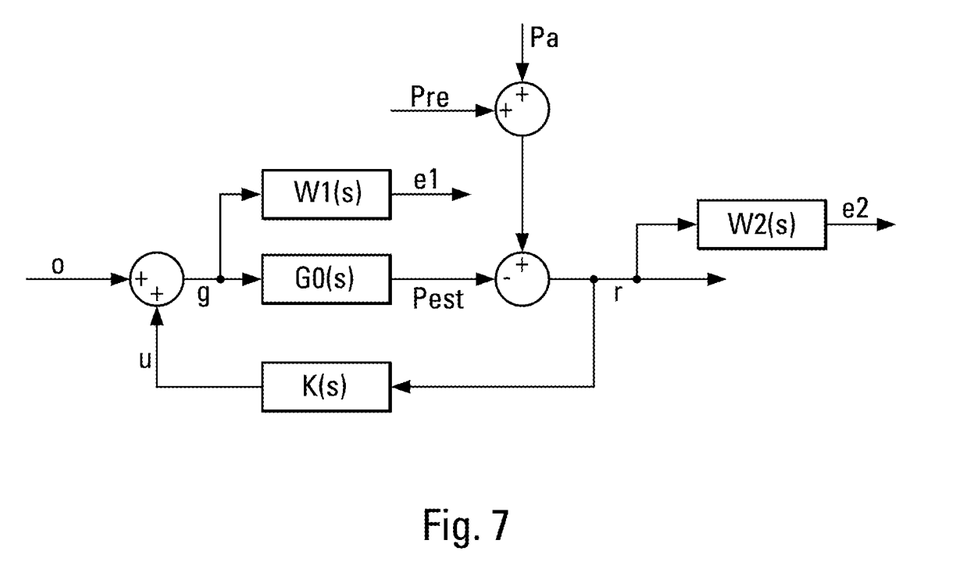

The transfer between the order o and the input g of G0(s) is none other than the function S(s) which is equal to the transfer between the fault Pa and the residual r, while the function S(s)G0(s) always reflects the same transfer between the order o and the residual r.

After setting up the weighting functions, the system is cast into standard form (LFT) (similar to that of FIG. 4 but with r instead of y), with:

: the augmented system (representing the functions G0(s), W1(s) and W2(s));
: the exogenous input;

: the exogenous outputs (signals to be monitored);
: the control; and
r: the residual.

The transfer matrix $F_l(G_{aug}(s),K(s))$ relating the exogenous input and outputs is then readily computed:

$$\begin{pmatrix} e1(s) \\ e2(s) \end{pmatrix} = \begin{pmatrix} W1(s)S(s) \\ -W2(s)S(s)G_0(s) \end{pmatrix} o(s)$$

with $S=(I+G_0K)^{-1}$

The standard $H_\infty$ problem which stems therefrom is the following: determine a number $\gamma>0$, and the gain of the feedback loop $K(s)$ stabilizing the looped system and ensuring:

$$\left\| \begin{matrix} W1S \\ -W2SG_0 \end{matrix} \right\|_\infty < \gamma$$

In order to choose the appropriate weighting functions, the same (dichotomy-based) iterative procedure used in the synthesis with two inputs is applied: optimal choice of the weighting functions by iteration; computation of the dynamic gain $K(s)$ of the feedback loop with the aid of the Glover-Doyle algorithm for these weightings; generation of the Bode plots of the two transfers $S(s)$ and $S(s)G_0(s)$; and if ($|S|>1$ and $|SG0|<1$, $\forall f \in [1,10]$Hz), then the weightings and gain are retained. Otherwise, we return to the first step and recommence the processing.

It is therefore necessary, in the same manner, to retain the weighting functions for which the best compromise is obtained between the two transfers $S(s)$ and $S(s)G_0(s)$. This variant with respect to the previous makes it possible to impose a template on the transfer between the residual and the order which must remain low and not too frenetic so as to limit the fatigue and the saturations of the actuator. On the other hand, fewer degrees of freedom are available than in the 2-input synthesis, since only two transfers are imposed, instead of four.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method for detecting at least one oscillatory fault in at least one positional servocontrol arrangement of at least one control surface of an aircraft, said servocontrol arrangement forming part of a system of electric flight controls of the aircraft, the system including said control surface which is mobile, and whose position with respect to the aircraft is adjusted by at least one actuator, said actuator which adjusts the position of said control surface, as a function of at least one actuation order received, at least one sensor which measures the actual position of said control surface, and a computer which calculates a control surface control order, which receives said measured actual position and which deduces therefrom an actuation order which is transmitted to said actuator, and the method comprising:
    coupling, to the control surface, at least one actuator configured to adjust the position of the control surface with respect to the aircraft in response to at least one actuation order;
    coupling, to the control surface, at least one sensor configured to measure the actual position of the control surface;
    communicatively coupling a computer to the at least one actuator and the at least one sensor, the computer configured to calculate a control surface control order, receive the measured actual position, determine the actuation order, transmit the actuation order to the at least one actuator, and detect the at least one oscillatory fault by performing the steps of:
    a) estimating a theoretical position corresponding to a reference position of said control surface in the absence of any fault with the aid of said control surface control order which feeds a model of said actuator;
    b) computing the difference between said theoretical position estimated in step a) and the actual position measured by said sensor so as to form a residual value; and
    c) comparing the residual value with at least one predetermined threshold value; and
    counting all the successive and alternate oversteppings of said predetermined threshold value by said residual value, and, as soon as the number resulting from said counting becomes greater than a predetermined number, an oscillatory fault is detected which represents a periodic signal of sinusoidal type, whose frequency, amplitude and phase follow a uniform law,
    wherein in step a), at each iteration, said theoretical position is estimated with the aid of at least one auxiliary value corresponding to the residual value formed in step b) of the previous iteration, that has been multiplied by a dynamic gain, and
    wherein said dynamic gain is computed with the aid of an H-infinity synthesis procedure, and a corrector is used for carrying out a correction in step a) making it possible to obtain an amplification gain in a passband corresponding to the frequency band in which a fault may occur, and an attenuation outside of this passband.

2. The method as claimed in claim 1,
    wherein, to determine said dynamic gain, the H-infinity synthesis is applied in four steps comprising:
    definition of a synthesis scheme;
    setting up of weighting functions;
    casting into standard form; and
    choosing of the weighting functions and computation of the optimal gain.

3. The method as claimed in claim 1, further comprising:
    applying weighting functions that impose templates so as to favor maximum gains on defined frequency domains.

4. The method as claimed in claim 1,
    wherein said model of the actuator comprises a low-order function.

5. The method as claimed in claim 2,
    wherein the weighting functions are based on at least one of the following parameters:
    the estimated theoretical position; and
    the residual value.

6. The method as claimed in claim 5,
    wherein, to determine the weighting functions, an iterative procedure is applied to the models of the transfer functions, which includes four steps:

α1) choosing of the weighting functions;
α2) computation of the dynamic gain of the feedback loop with the aid of the Glover-Doyle algorithm for these weightings;
α3) generation of the Bode plots of two transfers; and
α4) if predefined conditions are fulfilled by the two transfers, the weighting functions are retained; otherwise, return to step α1).

7. A device, including a processor, for automatically detecting at least one oscillatory fault in at least one positional servocontrol arrangement of at least one control surface of an aircraft, said servocontrol arrangement forming part of a system of electric flight controls of the device comprising:
   a first means configured to estimate, in an iterative manner, with the aid of a control surface control order provided to an actuator coupled to the control surface, and of a model, a theoretical position corresponding to a reference position of said control surface in the absence of any fault;
   a second means configured to compute the difference between said theoretical position estimated by said first means and the actual position measured by a sensor coupled to and configured to measure the actual position of the control surface, wherein;
   so as to form a residual value;
   a third means configured to perform the steps of:
   comparing this residual value with at least one predetermined threshold value;
   carrying out a counting of all the successive and alternate oversteppings of said predetermined threshold by said residual value;
   detecting an oscillatory fault as soon as the number resulting from said counting becomes greater than a predetermined number; and
   a loopback means configured to form and inject into said first means at least one auxiliary value corresponding to the residual value formed by said second means at the previous iteration, which has been multiplied by a dynamic gain, said first means being formed so as to estimate said theoretical position with the aid, moreover, of said auxiliary value,
   wherein said loop back means are formed so as to compute, with the aid of an H-infinity synthesis procedure, a dynamic gain which is used to form the auxiliary value to be reinjected, and said device comprises a corrector for carrying out a correction to obtain an amplification gain in a passband corresponding to the frequency band in which a fault may occur, and an attenuation outside of the passband.

8. An aircraft, comprising:
   a system of electric flight controls, said system comprising at least one means for bringing about a control surface control order for at least one control surface of the aircraft and at least one positional servocontrol arrangement for this control surface, which comprises:
   said control surface which is mobile, and whose position with respect to the aircraft is adjusted by at least one actuator;
   said actuator which adjusts the position of said control surface, as a function of at least one actuation order received;
   at least one sensor which measures the actual position of said control surface; and
   a computer which calculates said control surface control order, which receives said actual position and which deduces therefrom an actuation order which is transmitted to said actuator, a first means for estimating, in an iterative manner, with the aid of said control surface control order and of a model, a theoretical position corresponding to a reference position of said control surface in the absence of any fault;
   a second means configured to compute the difference between said theoretical position estimated by said first means and the actual position measured by said sensor so as to form a residual value;
   a third means for:
      comparing this residual value with at least one predetermined threshold value;
      carrying out a counting of all the successive and alternate oversteppings of said predetermined threshold by said residual value;
      detecting an oscillatory fault as soon as the number resulting from said counting becomes greater than a predetermined number; and
   a loopback means for forming and injecting into said first means at least one auxiliary value corresponding to the residual value formed by said second means at the previous iteration, which has been multiplied by a dynamic gain, said first means being formed so as to estimate said theoretical position based on said auxiliary value.

* * * * *